United States Patent
Unru (10) Patent No.: US 12,438,363 B2
(45) Date of Patent: Oct. 7, 2025

(54) METHOD FOR OPERATING A DC VOLTAGE GRID AND POWER CONVERTER FOR CONNECTING A DC VOLTAGE GRID TO AN AC VOLTAGE GRID

(71) Applicant: SMA Solar Technology AG, Niestetal (DE)

(72) Inventor: Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 55 days.

(21) Appl. No.: 18/316,303

(22) Filed: May 12, 2023

(65) Prior Publication Data

US 2023/0283069 A1 Sep. 7, 2023

Related U.S. Application Data (63) Continuation of application No. PCT/EP2021/081547, filed on Nov. 12, 2021.

(30) Foreign Application Priority Data

Nov. 12, 2020 (DE) ...................... 10 2020 129 917.6

(51) Int. Cl.
*H02J 1/00* (2006.01)
*H02M 1/00* (2006.01)
(Continued)

(52) U.S. Cl.
CPC .............. *H02J 1/00* (2013.01); *H02M 1/0009* (2021.05); *H02M 3/04* (2013.01); *H02M 7/44* (2013.01)

(58) Field of Classification Search
CPC .... H02J 1/00; H02J 5/00; H02J 1/102; H02M 1/0009; H02M 3/04; H02M 7/44; H02M 1/32; H02M 7/797; H02M 1/007
See application file for complete search history.

(56) References Cited

U.S. PATENT DOCUMENTS 10,998,730 B1 * 5/2021 Willson .................. H02S 40/32
2019/0237994 A1 8/2019 Takeuchi
(Continued)

FOREIGN PATENT DOCUMENTS

| CN | 109149549 A | 1/2019 |
| DE | 102018116013 A1 | 1/2020 |
| JP | 2020058232 A * | 4/2020 |

OTHER PUBLICATIONS

International Search Report dated Feb. 16, 2022 for International Application No. PCT/EP2021/081547.
(Continued)

*Primary Examiner* — Daniel Cavallari
(74) *Attorney, Agent, or Firm* — Eschweiler & Potashnik, LLC (57) ABSTRACT

An electrical system includes a power converter and a DC/DC converter configured to transfer power between an AC side and a DC side thereof. The AC side is connected to an AC supply grid and the DC side is connected to a DC grid. The power converter has a bridge circuit connected to the AC side of the power converter via AC relays and connected to the DC side of the power converter via circuit breakers. A measuring device measures a DC power converter voltage and a DC/DC output voltage present on the output side of the DC/DC converter. A control circuit is configured to drive the DC/DC converter. The application also describes a method for operating an electrical system.

18 Claims, 4 Drawing Sheets

(51) Int. Cl.
  *H02M 3/04* (2006.01)
  *H02M 7/44* (2006.01)

(56) References Cited

U.S. PATENT DOCUMENTS

2021/0265919 A1* 8/2021 Bhaskar ............... H02M 3/158
2022/0131383 A1* 4/2022 Milivojevic ........... H02J 1/106

OTHER PUBLICATIONS

"IEC 63112 ED1: Safety, functionality and classification of Photovoltaic Earth Fault Protection (PV EFP) equipment", Published Jun. 5, 2020.
"Sicherheit von Leistungsumrichtern zur Anwendung in photovoltaischen Energiesystemen—Teil 2: Besondere Anforderungen an Wechselrichter (IEC 62109-2:2011); Deutsche Fassung EN 62109-2:201 = Safety of power converters for use in photovoltaic power systems—Part 2: Particular requirements for invert", Published Apr. 12, 2010.
Dragicevic Tomislav et al. "DC Microgrids-Part II: A Review of Power Architectures, Applications, and Standardization Issues" IEEE Transactions on Power Electronics, Institute of Electrical and Electronics Engineers, USA, vol. 31, No. 5. Published May 1, 2016.
Lulu et al. "Investigation on the system grounding types for low voltage direct current systems", 2013 IEEE Electrical Power & Energy Conference, IEEE. Published on Aug. 21, 2013.

* cited by examiner

METHOD FOR OPERATING A DC VOLTAGE GRID AND POWER CONVERTER FOR CONNECTING A DC VOLTAGE GRID TO AN AC VOLTAGE GRID

CROSS REFERENCE TO RELATED APPLICATIONS

This application is a continuation of International Patent Application Number PCT/EP2021/081547, filed on Nov. 12, 2021, which claims priority to German Patent Application number 10 2020 129 917.7, filed on Nov. 12, 2020, and is hereby incorporated by reference in its entirety.

FIELD

The disclosure is directed to an electrical system and a method that enable safe operation of a DC energy system.

BACKGROUND

A DC energy system comprises at least one energy source that makes available electric power in the form of DC current, that is to say a DC source, for example, a battery, a PV generator or a fuel cell, and at least one load that consumes electric power in the form of DC current, that is to say a DC sink, for example, a consumer, and connections between these electrical components. The DC energy system may comprise a DC grid or a DC bus where the electrical components are connected, and comprise further sources, stores and/or consumers. The transition between a DC bus with a few connected components, for example, just one source and one sink, and a DC grid with a large number of such components is fluid. In this application, the term DC grid is also understood to mean a DC bus.

Such a DC grid may be operated with or without grounding. Depending on the specific operating mode, different monitoring and protection mechanisms may be required by standards in the event of a ground fault.

An ungrounded DC grid, in which the potentials DC+ and DC− of the respective DC lines DCL+ and DCL− have no fixed reference to ground potential, has the advantage that any first ground fault in the DC grid, for example, an insulation fault along one of the DC lines, still does not lead to any harm. However, insulation monitoring is required in order to detect the occurrence of any fault and, if necessary, to be able to initiate countermeasures when a first ground fault occurs, for example, to switch off the energy source or to disconnect the energy source and/or the fault location from the DC grid.

In a grounded DC grid, the potentials DC+ and DC− have a defined reference to ground potential. Such a ground reference may easily be implemented, for example, by way of a resistive connection between the ground potential and one of the DC potentials DC+ or DC−.

A DC grid may be connected, via a power converter, to a further energy grid, for example, a further DC grid or an AC grid, for example, an AC supply grid, and exchange electric power with the further energy grid, for example, in order to support or recharge the DC source in the DC grid. The DC grid may in principle also be supplied permanently or at times completely with energy from the further energy grid via the power converter, wherein the energy source of the DC grid may be used to buffer power fluctuations if necessary.

If the further energy grid has grounding, for example, in the form of a grounded neutral conductor, and the power converter is designed to be transformerless, that is to say has no galvanic isolation between the AC and DC side, the DC grid is automatically provided with a fixed ground reference, that is to say grounded, via the power converter. The specific position of the potentials of the DC grid relative to the ground reference is predefined in this case by the specifically used topology of the power converter. By way of example, on the DC side, the power converter may have a divided link circuit the center tap, that is to say mid-potential, of which is connected to a neutral conductor with a fixed ground reference, such that the DC potentials in the link circuit are largely symmetrical about the ground potential.

In this respect, a DC grid that is not grounded per se likewise becomes a grounded grid through a connection to a grounded energy grid via a transformerless power converter. This may thus result in two operating states for such a DC grid: an ungrounded "stand-alone" mode and a grounded mode when connected to the grounded energy grid. This should be taken into account when designing the system.

However, if a grounded DC grid is connected to a grounded AC grid, for example, via a power converter, this may result in such high, uncontrolled current flows between the grids that components of the power converter or components of the grids are damaged. This also applies if an insulation fault is present in a supposedly ungrounded DC grid.

In this application, the abbreviation DC stands for direct current or direct voltage and AC stands for alternating current or alternating voltage.

SUMMARY

The disclosure is directed to an electrical system and a method that enable safe operation of a DC energy system.

An electrical system has a power converter and a DC/DC converter, wherein the power converter is configured to transfer power between an AC side of the power converter and a DC side of the power converter. The AC side of the power converter is connectable to a grounded three-phase AC supply grid and the DC side of the power converter is connectable to an ungrounded DC grid. The power converter has a bridge circuit the AC terminals of which are connectable to the AC side of the power converter via AC relays, and the DC terminals of which are connectable to the DC side of the power converter via circuit breakers, wherein the DC/DC converter has an output side that faces the DC side of the power converter. The electrical system has a measuring circuit or device that is configured to measure a DC power converter voltage and a DC/DC output voltage present on the output side of the DC/DC converter, wherein the DC power converter voltage and the DC/DC output voltage are present on opposite sides of the circuit breakers. The electrical system has a control circuit or unit that is configured to drive the DC/DC converter such that a DC/DC output voltage is set on the output side of the DC/DC converter, the absolute value of which voltage corresponds to the DC power converter voltage.

This allows the DC voltages to be matched before the circuit breakers are closed, and may thus help to prevent excessively large compensation currents from flowing during or after the closure of the circuit breakers. Operational safety may additionally be supported.

This, for example, enables permission of a variable connection of an ungrounded DC grid to a grounded AC supply grid, for example, via a transformerless power converter, without having to change the DC-side protection concept in the process.

This may have advantages over DC grids that themselves have a ground reference. If, for example, a DC energy system were to be grounded at DC−, then the selection of suitable topologies for the bridge circuit of the power converter would have to be limited, on the one hand, and the insulation of the lines at DC+ potential would have to be designed for the full system voltage to ground and vice versa, on the other hand. This may lead to considerable costs in the case of high system voltages. In addition, if a DC energy system itself were to have a ground reference, a second ground reference would result due to the connection to the grounded AC supply grid via a transformerless power converter. This could result in high compensation currents, in particular during or after the closure of the circuit breakers, and protective devices such as, for example, differential current sensors could be tripped.

The output side of the DC/DC converter is the side that faces the DC side of the power converter. There is initially a voltage on an input side of the DC/DC converter, in particular due to a DC link circuit of the power converter or another DC source in the DC grid, for example, a battery. The voltage on the output side of the DC/DC converter is the DC/DC output voltage. The output side is the side on which the voltage is settable, by the DC/DC converter, relative to the given voltage on the input side of the DC/DC converter.

The absolute value of the voltages may be matched for example, such that the DC/DC converter is arranged inside the power converter and the DC/DC output voltage is set by the DC/DC converter on that side of the circuit breakers on which the bridge circuit is also located. The absolute value of the voltages may also be matched for example, such that the DC/DC converter is arranged in the DC grid and the DC/DC output voltage is set by the DC/DC converter on that side of the circuit breakers opposite the bridge circuit.

Absolute value of the voltages is understood to mean the voltage between the DC lines of the DC grid or the voltage between the power converter-side terminals of the circuit breaker. This corresponds to a difference in the potentials of the two DC lines of the DC grid or the power converter-side terminals of the circuit breaker. The DC/DC output voltage is set to this absolute value of the voltage.

In one embodiment of the electrical system, the output side of the DC/DC converter is connected to the DC side of the power converter. In this case, the DC/DC converter may be arranged, for example, inside the power converter between the bridge circuit and the circuit breakers. In this embodiment, the DC/DC converter generates the DC/DC output voltage through suitable clocking from a link circuit voltage of the power converter. The output side of the DC/DC converter may then be connected to the DC side of the power converter via the circuit breakers, wherein the circuit breakers are arranged outside the power converter.

In one alternative embodiment of the electrical system, in which the output side of the DC/DC converter is connected to the DC side of the power converter, the DC/DC converter may, for example, also be arranged outside the power converter in the DC grid. In this embodiment, the DC/DC converter is able to generate the DC/DC output voltage, for example, through suitable clocking from a DC energy store in the DC grid, for example, from a battery. The output side of the DC/DC converter is then connected to the DC side of the power converter and the circuit breakers are arranged between the DC/DC converter and the bridge circuit. The circuit breakers may be arranged either inside or outside the power converter between the bridge circuit and the DC side of the power converter.

The DC/DC output voltage is settable on the output side of the DC/DC converter, and the DC power converter voltage is present on that side of the circuit breakers opposite the DC/DC converter.

In one embodiment of the electrical system, the measuring circuit or device is configured to determine the DC power converter voltage and the DC/DC output voltage by measuring the voltages on the respective DC lines or terminals to ground potential, wherein a respective DC line is connectable to a respective DC terminal via the circuit breakers. Each of the DC lines may thereby be measured individually with respect to ground potential.

In one embodiment of the electrical system, the control circuit or unit is configured to drive the DC/DC converter such that the respective voltages to ground potential of the DC power converter voltage and the DC/DC output voltage are matched to one another. In addition to the absolute value of the voltage, the position of the voltages is also matched in this embodiment, that is to say, in addition to the absolute value, also the position of the potentials of the DC lines or the DC terminals with respect to one other and in relation to a third point, for example, to ground potential.

In one embodiment of the electrical system, the control circuit or unit is configured to close the circuit breakers when the DC/DC output voltage corresponds to the DC power converter voltage. This allows the voltages to be matched before the DC grid is connected and makes it possible to avoid excessively high compensation currents during and after the closure of the circuit breakers.

In one embodiment of the electrical system, the DC/DC output voltage corresponds to the DC power converter voltage, and these together form a DC bus voltage of the DC grid when the circuit breakers are closed. The DC grid is ungrounded per se, but is grounded via the power converter and the grounded AC supply grid when the circuit breakers are closed and the AC relays are likewise closed. The power converter is able in this case to precisely influence and control the DC voltages and, where applicable, their position in relation to the ground potential. This may improve operating safety.

In one embodiment of the electrical system, the control circuit or unit is configured to drive the DC/DC converter such that the DC bus voltage is balanced, wherein the balancing is performed, for example, around the ground potential as mid-potential. If the power converter is connected to the DC grid, it is able to influence the voltage in the DC grid. Balancing around ground potential offers advantages here since the respectively highest voltage of the DC lines in the DC grid to ground potential may be kept lower than the voltage between the DC lines in the DC grid, and this simplifies the design and helps to improve safety.

In one embodiment of the electrical system, the control circuit or unit is configured to set the DC/DC output voltage on the output side of the DC/DC converter by clocking a symmetrical DC/DC voltage converter. In this embodiment, the DC/DC converter is designed as a symmetrical DC/DC voltage converter.

In one embodiment of the electrical system, the control circuit or unit is configured to connect the AC terminals of the bridge circuit to the AC side of the power converter via AC relays and then to set the DC/DC output voltage. In this embodiment, the power converter is connected to the AC supply grid before the DC/DC converter sets its DC/DC output voltage.

In one embodiment of the electrical system, the AC terminals and the DC terminals of the bridge circuit are galvanically coupled and the power transfer path between the AC side and the DC side of the power converter is, for example, designed to be transformerless. In the case of an AC supply grid with a ground reference, for example, a grounded TN or TT system, a link circuit voltage of such a transformerless power converter, which is in this respect galvanically coupling, is approximately symmetrical about ground potential after connection to the AC supply grid. In the case of a DC-side connection of this power converter to an asymmetrical DC bus, high compensation currents would arise, for example, if the asymmetry is caused by insulation faults in the DC grid. Such compensation or fault currents may be avoided or even compensated for by the electrical system by balancing the DC bus voltage around ground potential.

A method for operating an electrical system comprising a power converter and a DC/DC converter in a DC grid, wherein the power converter is configured to transfer power between an AC side of the power converter and a DC side of the power converter, comprises the following acts:

measuring a DC power converter voltage, setting a DC/DC output voltage on an output side of the DC/DC converter, wherein the DC power converter voltage and the DC/DC output voltage are present on opposite sides of the circuit breakers, and wherein the absolute value of the set DC/DC output voltage corresponds to the measured DC power converter voltage.

Optionally, in the act in which the DC power converter voltage is measured, the DC/DC output voltage may also be measured.

Absolute value of the voltages is understood to mean the voltage between the DC lines of the DC grid or the voltage between the power converter-side terminals of the circuit breaker. This corresponds to a difference in the potentials of the two DC lines of the DC grid or the power converter-side terminals of the circuit breaker. The DC/DC output voltage is set to this absolute value of the voltage.

In one embodiment of the method, the DC power converter voltage and the DC/DC output voltage are determined by measuring the voltages on respective DC lines or terminals to ground potential, wherein a respective DC line is connectable to a respective DC terminal via the circuit breakers. Each of the DC lines may thereby be measured individually with respect to ground potential.

In one embodiment of the method, the respective voltages to ground potential of the DC power converter voltage and the DC/DC output voltage are matched to one another. In addition to the absolute value of the voltage, the position of the voltages is also matched in this embodiment, that is to say, in addition to the absolute value, also the position of the potentials of the DC lines or the DC terminals with respect to one other and in relation to a third point, for example, to ground potential.

One embodiment of the method comprises the act wherein, after the DC/DC output voltage has been set, the output side of the DC/DC converter is connected to the power converter by closing the circuit breakers.

One embodiment of the method comprises the act wherein the AC terminals of the bridge circuit are connected to the AC side of the power converter via AC relays before the DC/DC output voltage is set.

One embodiment of the method comprises the act wherein, after the circuit breakers have been closed, the DC/DC converter balances the DC bus voltage, wherein the DC/DC output voltage corresponds to the DC power converter voltage and these together form a DC bus voltage of the DC grid when the circuit breakers are closed. The DC grid is ungrounded per se, but is grounded via the AC supply grid when the circuit breakers are closed and the AC relays are likewise closed. The balancing is performed, for example, around the ground potential as mid-potential.

BRIEF DESCRIPTION OF THE FIGURES

The disclosure is explained in more detail below with the aid of figures.

DETAILED DESCRIPTION

Figure 1:
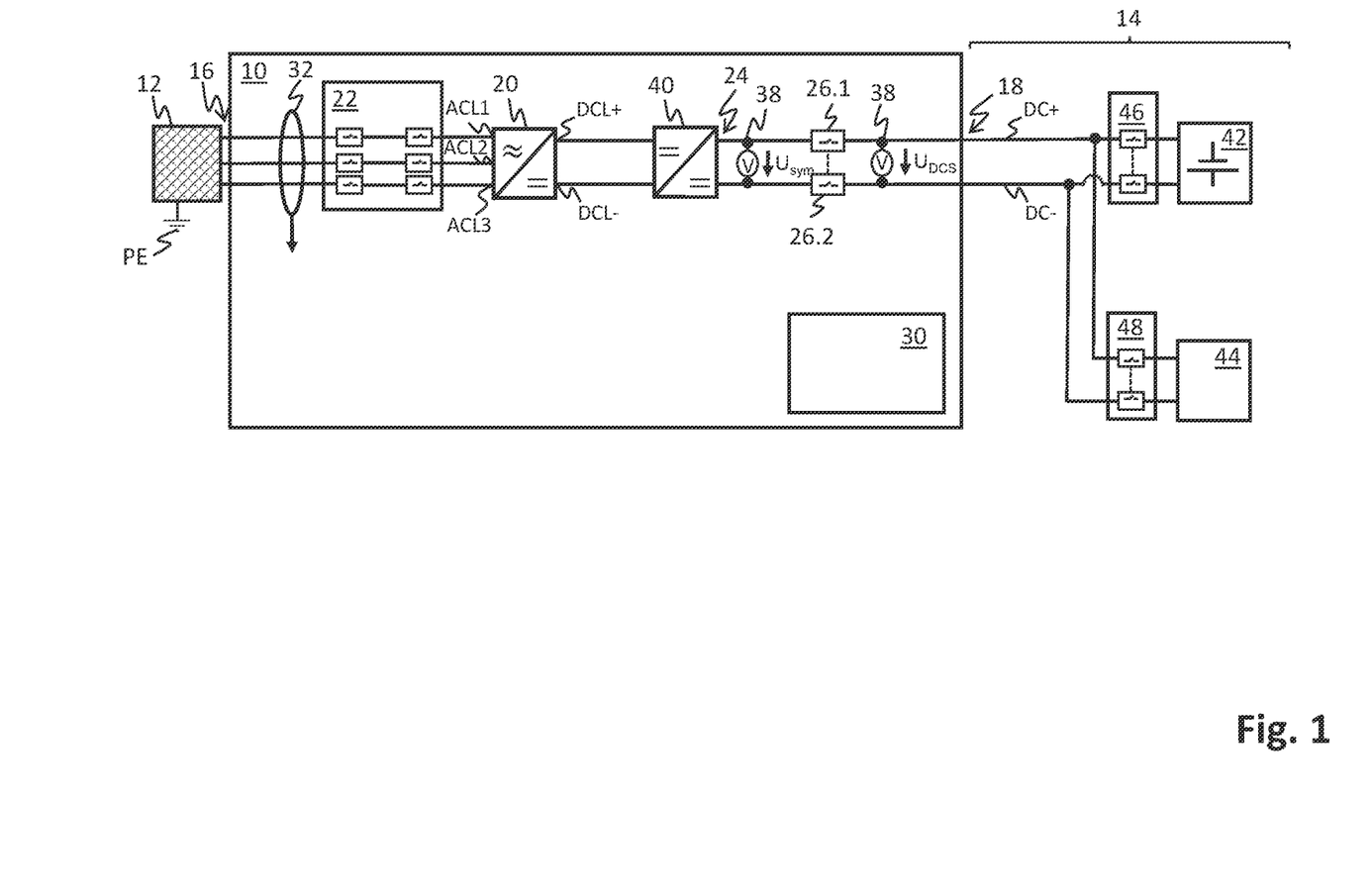
FIG. 1 schematically shows one embodiment of an electrical system.

FIG. 1 schematically illustrates one embodiment of an electrical system. A power converter 10 has an AC side 16 and a DC side 18. A three-phase AC supply grid 12 grounded at the ground potential PE is connected at the AC side 16. A battery 42 is connectable to the DC grid 14 via DC switches 46. A load 44 is connectable to the DC grid via DC switches 48. The load 44 may, for example, comprise one or more consumers, such as, for example, a machine, an industrial plant, or even an electrolyser. The battery 42 and the load 44 are connected to the power converter 10 via DC lines DC+, DC−.

The power converter 10 has a bridge circuit 20 that is configured to convert AC current or AC voltage at AC terminals ACL1, ACL2, ACL3 into DC current or DC voltage at DC terminals DCL+, DCL−. The bridge circuit 20 is likewise configured to convert DC current or DC voltage at the DC terminals DCL+, DCL− into AC current or AC voltage at the AC terminals ACL1, ACL2, ACL3. In the illustrated example embodiment, the conversion takes place by virtue of a control circuit or unit 30 driving semiconductor switches of the bridge circuit 20 in an appropriate manner. The bridge circuit 20 with semiconductor switches is generally configured to be transformerless, that is to say the AC terminals ACL1, ACL2, ACL3 and the DC terminals DCL+, DCL− of such a bridge circuit are galvanically coupled. If the AC supply grid has a ground reference, for example, provided by a neutral conductor grounded to PE, the DC terminals DCL+, DCL− are thus automatically grounded via the bridge circuit 20 during regular operation of the power converter 10.

The DC lines DC+, DC− are connected to the DC terminals DCL+, DCL−. The specific position of the potentials of the DC lines relative to the ground reference (DC+/DC− to PE) are predefined in this case by the specifically used topology of the bridge circuit 20. By way of example, the bridge circuit 20 may have a DC-sided divided DC link circuit, the center tap of which is connected to the neutral conductor of the AC supply grid 12 with a fixed ground reference PE as mid-potential, such that the DC potentials in the DC link circuit and thus at the DC terminals DCL+, DCL− are set largely symmetrically about the ground potential PE. In this respect, a DC grid 14 that is not grounded per se likewise becomes a grounded DC grid 14 through a connection to a grounded AC supply grid 12 via the transformerless power converter 10. There may thus be two operating states for the DC grid 14: an ungrounded "stand-alone mode" with a power supply from the battery 42 and a grounded mode when connected to the grounded AC supply grid 12.

The AC terminals ACL1, ACL2, ACL3 may be connected to the AC side 16, and thus the bridge circuit 20 may be connected to the AC grid 12, via AC relays 22. The power converter 10 also has a fault current measurement 32 at the AC terminals ACL1, ACL2, ACL3, which is based on a differential current measurement of the three AC terminals ACL1, ACL2, ACL3.

The power converter 10 has a DC/DC converter 40, the input side of which is connected to the DC terminals DCL+, DCL− of the bridge circuit 20. The DC/DC converter 40 may be used to set a DC/DC output voltage $U_{Sym}$ on an output side 24 of the DC/DC converter 40 relative to the voltage at the DC terminals DCL+, DCL−. The DC/DC output voltage $U_{Sym}$ may be set, for example, by the control circuit or unit 30 driving semiconductor switches of the DC/DC converter 40.

The output side 24 of the DC/DC converter 40 may be connected to the DC side 18 via circuit breakers 26.1, 26.2. A positive DC line DC+ of the DC grid 14 is connected to the circuit breaker 26.1 and a negative DC line DC− of the DC grid 14 is connected to the circuit breaker 26.2. A measuring circuit or device 38 is configured to measure the DC/DC output voltage $U_{Sym}$ and/or a power converter voltage $U_{DCS}$. The power converter voltage $U_{DCS}$ is present on the DC side 18 of the power converter 10, that is to say at the circuit breakers 26.1, 26.2 on the side opposite the DC/DC converter 40.

Figure 2:
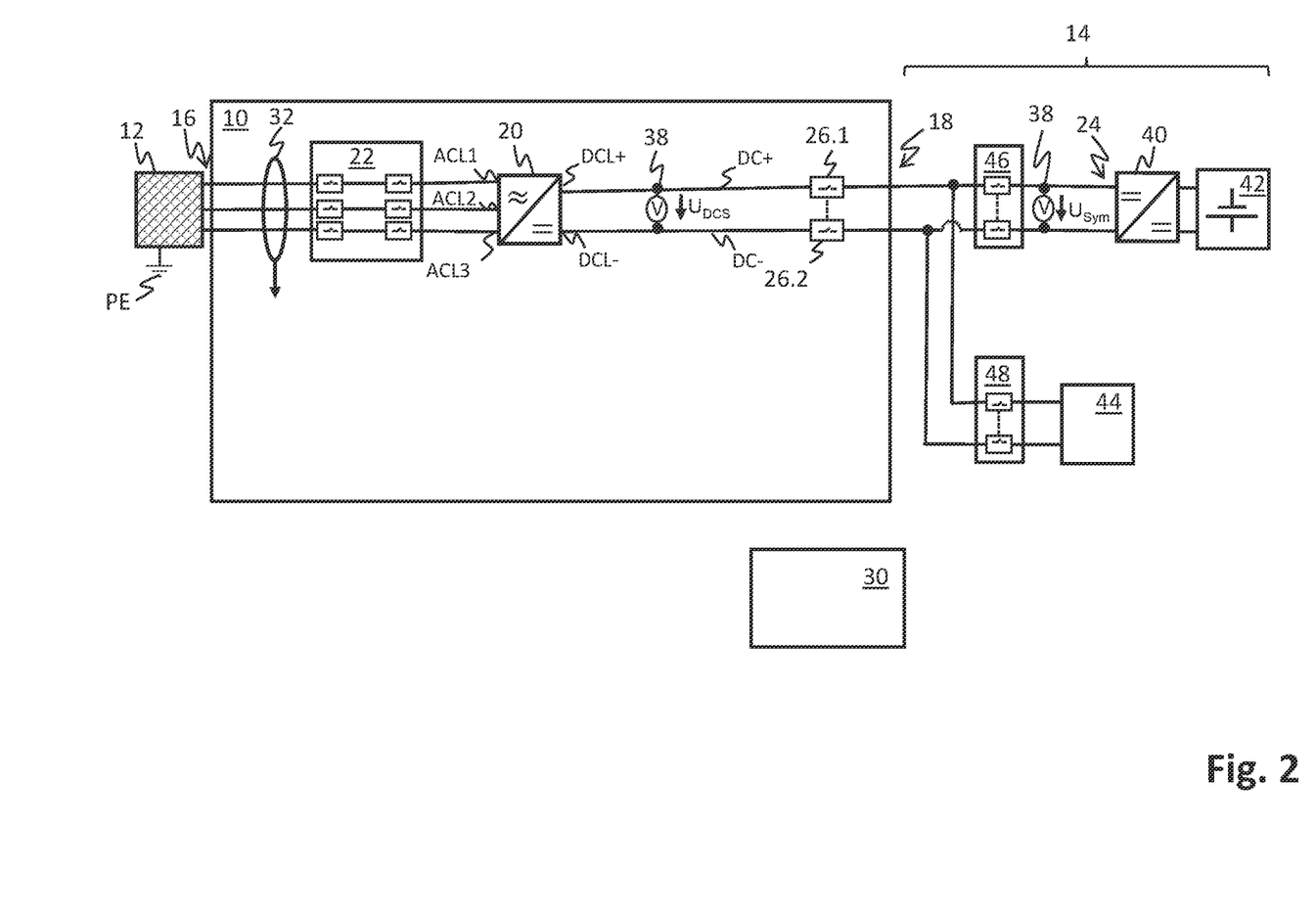
FIG. 2 schematically shows another embodiment of an electrical system.

FIG. 2 schematically illustrates another embodiment of the electrical system. The power converter 10 comprises the AC side 16 and the DC side 18. The three-phase AC supply grid 12 grounded at the ground potential PE is connected at the AC side 16. The battery 42 is connectable to the DC grid 14 via DC switches 46. The load 44 is connectable to the DC grid via DC switches 48. The load 44 may, for example, comprise one or more consumers, such as, for example, a machine, an industrial plant, or even an electrolyzer. The battery 42 and the load 44 are connected to the power converter 10 via the DC lines DC+, DC−.

The power converter 10 has the bridge circuit 20 that is configured to convert AC current or AC voltage at AC terminals ACL1, ACL2, ACL3 into DC current or DC voltage at DC terminals DCL+, DCL−. The bridge circuit 20 is likewise configured to convert DC current or DC voltage at the DC terminals DCL+, DCL− into AC current or AC voltage at the AC terminals ACL1, ACL2, ACL3. In the illustrated example embodiment, the conversion takes place by virtue of the control circuit or unit 30 driving semiconductor switches of the bridge circuit 20 in an appropriate manner. The bridge circuit 20 with semiconductor switches is generally configured to be transformerless, that is to say the AC terminals ACL1, ACL2, ACL3 and the DC terminals DCL+, DCL− of such a bridge circuit are galvanically coupled. If the AC supply grid has a ground reference, for example, provided by a neutral conductor grounded to PE, the DC terminals DCL+, DCL− are thus automatically grounded via the bridge circuit 20 during regular operation of the power converter 10.

The DC lines DC+, DC− are connected to the DC terminals DCL+, DCL−. The specific position of the potentials of the DC lines relative to the ground reference (DC+/DC− to PE) are predefined in this case by the specifically used topology of the bridge circuit 20. By way of example, the bridge circuit 20 may have, on the DC side, a DC-sided divided DC link circuit, the center tap of which is connected to the neutral conductor of the AC supply grid 12 with a fixed ground reference PE as mid-potential, such that the DC potentials in the DC link circuit and thus at the DC terminals DCL+, DCL− are set largely symmetrically about the ground potential PE. In this respect, a DC grid 14 that is not grounded per se likewise becomes a grounded DC grid 14 through a connection to a grounded AC supply grid 12 via the transformerless power converter 10. There may thus be two operating states for the DC grid 14: an ungrounded "stand-alone mode" with a power supply from the battery 42 and a grounded mode when connected to the grounded AC supply grid 12.

The AC terminals ACL1, ACL2, ACL3 may be connected to the AC side 16, and thus the bridge circuit 20 may be connected to the AC grid 12, via AC relays 22. The power converter 10 also comprises the fault current measurement 32 at the AC terminals ACL1, ACL2, ACL3, which is based on a differential current measurement of the three AC terminals ACL1, ACL2, ACL3.

The DC/DC converter 40 is arranged in the DC grid 14 and in this respect outside the power converter 10. The input side of the DC/DC converter 40 is connected to the battery 42. On the output side 24 of the DC/DC converter 40, the DC/DC output voltage $U_{Sym}$ may be set relative to the voltage of the battery 42. The DC/DC output voltage $U_{Sym}$ may be set, for example, by the control circuit or unit 30 driving semiconductor switches of the DC/DC converter 40.

The DC terminals DCL+, DCL− of the bridge circuit 20 may be connected to the DC side 18 via circuit breakers 26.1, 26.2. A positive DC line DC+ may be connected to the DC side 18 via the circuit breaker 26.1 and a negative DC line DC− may be connected to the DC side via the circuit breaker 26.2. A measuring circuit or device 38 is configured to measure the DC/DC output voltage $U_{Sym}$ and/or a power converter voltage $U_{DCS}$. The power converter voltage $U_{DCS}$ is present on the DC side 18 of the bridge circuit 20, that is to say at the circuit breakers 26.1, 26.2 on the side opposite the DC/DC converter 40. In the illustrated example embodiment, the power converter voltage $U_{DCS}$ is thus present at the DC terminals DCL+, DCL− of the bridge circuit 20 of the power converter 10.

Figure 3:
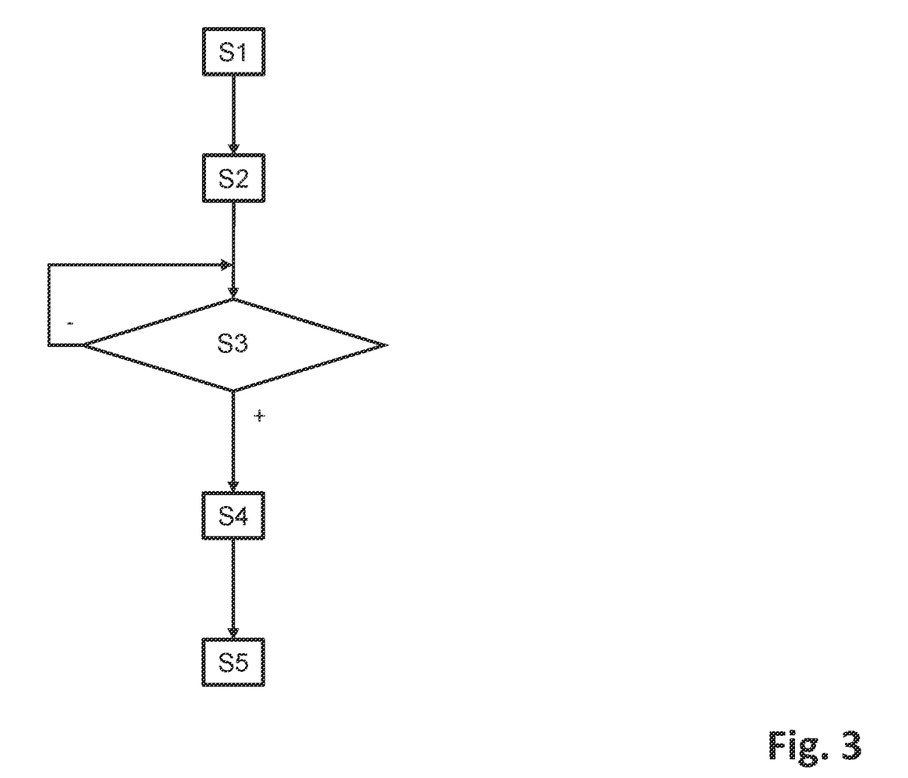
FIG. 3 schematically shows one embodiment of a method.

FIG. 3 schematically illustrates one example embodiment of a method for operating the electrical system.

In an act S1, the AC terminals ACL1, ACL2, ACL3 of the bridge circuit 20 are connected to the AC side 16 of the power converter 10 via the AC relays 22.

At act S2, the DC power converter voltage $U_{Sym}$ is measured. Optionally, at act S2, the DC/DC output voltage $U_{Sym}$ may also additionally be measured. The DC/DC output voltage $U_{Sym}$ may be set on the output side 24 of the DC/DC converter 40, wherein the DC power converter voltage $U_{DCS}$ and the DC/DC output voltage $U_{Sym}$ are present on opposite sides of the circuit breakers 26.1, 26.2. The DC power converter voltage $U_{DCS}$ and/or the DC/DC output voltage $U_{Sym}$ may be determined by measuring the voltages on the respective DC lines DC+, DC− or DC terminals DCL+, DCL− to ground potential PE. This means that each of the DC lines DC+, DC− or the DC terminals DCL+, DCL− can be measured individually with respect to ground potential PE.

At act S3, the DC/DC output voltage $U_{Sym}$ on the output side 24 of the DC/DC converter 40 is set such that the set DC/DC output voltage $U_{Sym}$ is matched to the measured DC power converter voltage $U_{DCS}$. The respective voltages to ground potential PE of the DC power converter voltage $U_{DCS}$ and the DC/DC output voltage $U_{Sym}$ may in this case be matched to one another. The voltages are in this case matched to one other in terms of absolute value and position. Act S3 is repeated until the two voltages are matched to one another.

Act S4 is carried out when the voltages are matched successfully. At S4, after setting of the DC/DC output voltage $U_{Sym}$, the output side 24 of the DC/DC converter 40 is connected to the DC side 18 of the power converter 10 by closing the circuit breakers 26.1, 26.2 at a time is (FIG. 4).

At act S5, the DC/DC converter 40 balances the DC bus voltage after closure of the circuit breakers 26.1, 26.2, wherein the balancing is performed in particular around the ground potential as mid-potential.

Figure 4:
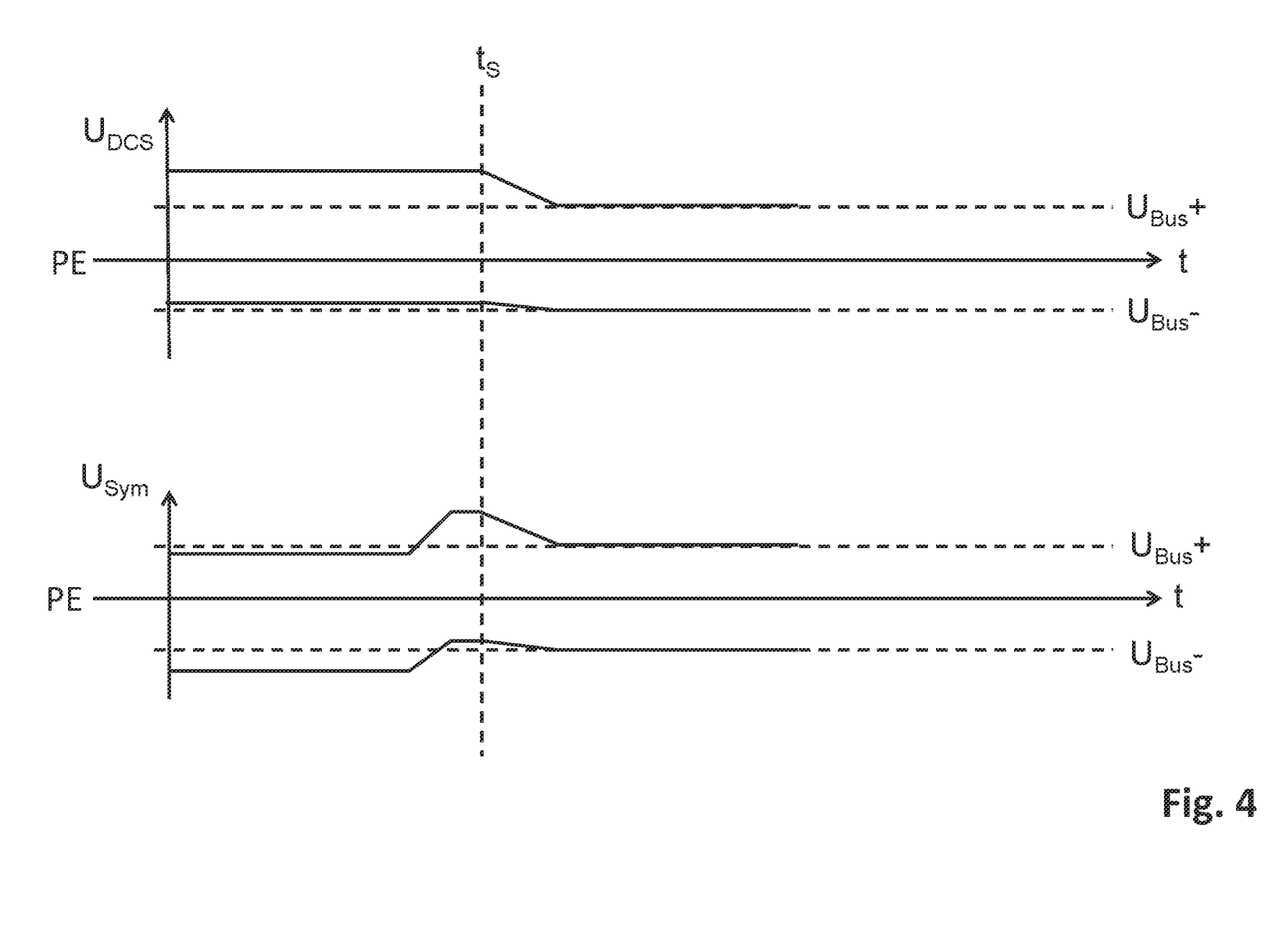
FIG. 4 schematically shows possible courses of voltages.

FIG. 4 schematically illustrates, by way of example, the characteristic of the DC power converter voltage $U_{DCS}$ and of the DC/DC output voltage $U_{Sym}$. Both voltages are illustrated in relation to the ground potential PE. The top line in the graphs illustrates the potential of the positive DC line DC+ or the positive DC terminal DCL+ with respect to ground potential PE, and the bottom line illustrates the potential of the negative DC line DC− or the negative DC terminal DCL− with respect to ground potential PE.

Initially, the DC power converter voltage $U_{DCS}$ and DC/DC output voltage $U_{Sym}$ are independent of one another and have different values. The DC/DC output voltage $U_{Sym}$ is then matched to the DC power converter voltage $U_{DCS}$ in terms of absolute value and position with respect to ground potential PE. This is, in one embodiment, carried out after closing the AC relays 22 and by driving the semiconductor switches of the DC/DC converter 40. The driving is, in one embodiment, carried out by the control circuit or unit 30.

At the time $t_S$, the circuit breakers 26.1 and 26.2 are closed. When the circuit breakers 26.1, 26.2 are closed, the DC/DC output voltage $U_{Sym}$ corresponds to the DC power converter voltage $U_{DCS}$, and these together form a DC bus voltage of the DC grid 14. The DC grid 14 is ungrounded per se, but is grounded via the power converter 10 and the AC supply grid 12 when the circuit breakers 26.1, 26.2 are closed and the AC relays 22 are likewise closed.

After the closure of the circuit breakers 26.1, 26.2, the DC bus voltage is balanced by the DC/DC converter 40 or by the power converter 10, in a manner driven by the control circuit or unit 30. In the process, the upper voltage value is brought to a desired positive DC bus voltage $U_{bus+}$ and the lower voltage value is brought to a desired negative DC bus voltage $U_{bus-}$. The desired positive DC bus voltage $U_{bus+}$ and the desired negative DC bus voltage $U_{bus-}$ are, in one embodiment, equal here in terms of absolute value and position with respect to ground potential PE, and thus symmetrical about the ground potential PE. The DC bus voltage is thus balanced with respect to the ground potential PE.

What is claimed is:

1. An electrical system comprising
a power converter and a DC/DC converter,
wherein the power converter is configured to transfer power between an AC side of the power converter and a DC side of the power converter,
wherein the power converter comprises a bridge circuit comprising AC terminals connected to the AC side of the power converter via AC relays and comprising DC terminals connected to the DC side of the power converter via circuit breakers,
wherein the DC/DC converter comprises an output side that is configured to couple electrically to the DC side of the power converter, and
wherein the electrical system comprises a measuring circuit or device configured to measure a DC power converter voltage and a DC/DC output voltage present on the output side of the DC/DC converter,
wherein the DC power converter voltage and the DC/DC output voltage are present on opposite sides of the circuit breakers,
wherein the electrical system has a control circuit configured to drive the DC/DC converter such that the DC/DC output voltage is set on the output side of the DC/DC converter, an absolute value of which voltage corresponds to the DC power converter voltage.

2. The electrical system as claimed in claim 1, wherein the DC/DC converter is external to the power converter 10, and the output side of the DC/DC converter is connected to the DC side of the power converter.

3. The electrical system as claimed in claim 1, wherein the DC/DC converter is internal to the power converter, and is arranged between the bridge circuit and the circuit breakers.

4. The electrical system as claimed in claim 1, wherein the circuit breakers are arranged between the DC/DC converter and the bridge circuit.

5. The electrical system as claimed in claim 1, wherein the measuring circuit or device is configured to determine the DC power converter voltage and/or the DC/DC output voltage by measuring voltages on respective DC lines to ground potential, wherein a respective DC line is connected to a respective DC terminal.

6. The electrical system as claimed in claim 1, wherein the control circuit is configured to drive the DC/DC converter such that respective voltages to ground potential of the DC power converter voltage and the DC/DC output voltage are matched to one another.

7. The electrical system as claimed in claim 1, wherein the control circuit is configured to close the circuit breakers when the DC/DC output voltage corresponds to the DC power converter voltage.

8. The electrical system as claimed in claim 1, wherein the DC/DC output voltage corresponds to the DC power converter voltage and forms a DC bus voltage of a DC grid.

9. The electrical system as claimed in claim 8, wherein the control circuit is configured to drive the DC/DC converter such that the DC bus voltage is balanced, wherein balancing is performed around a ground potential as a mid-potential.

10. The electrical system as claimed in claim 1, wherein the control circuit is configured to set the DC/DC output voltage on the output side of the DC/DC converter by clocking a symmetrical DC/DC voltage converter.

11. The electrical system as claimed in claim 1, wherein the control circuit is configured to connect the AC terminals of the bridge circuit to the AC side of the power converter via AC relays and then to set the DC/DC output voltage.

12. The electrical system as claimed in claim 1, wherein the AC terminals and the DC terminals of the bridge circuit are galvanically coupled and a power transfer path between the AC side and the DC side of the power converter is transformerless.

13. A method for operating an electrical system as claimed in claim 1, comprising:
measuring a DC power converter voltage,
setting a DC/DC output voltage on the output side of the DC/DC converter,
wherein the DC power converter voltage and the DC/DC output voltage are present on opposite sides of the circuit breakers, and wherein an absolute value of the set DC/DC output voltage corresponds to the measured DC power converter voltage.

14. The method as claimed in claim 13, wherein the DC power converter voltage and the DC/DC output voltage are determined by measuring voltages on respective DC lines to ground potential, wherein a respective DC line is connected to a respective DC terminal.

15. The method as claimed in claim 14, wherein the respective measured voltages to ground potential of the DC power converter voltage and the DC/DC output voltage are matched to one another.

16. The method as claimed in claim 13, comprising connecting the output side of the DC/DC converter to the power converter by closing the circuit breakers after setting the DC/DC output voltage.

17. The method as claimed in claim 13, comprising connecting AC terminals of the bridge circuit to the AC side of the power converter via AC relays before setting the DC/DC output voltage.

18. The method as claimed in claim 13, comprising balancing a DC bus voltage using the DC/DC converter around a ground potential as mid-potential after the circuit breakers are closed.

* * * * *